United States Patent

Kaji et al.

[11] Patent Number: 5,222,761
[45] Date of Patent: Jun. 29, 1993

[54] AIRBAG RESTRAINT SYSTEM

[75] Inventors: Masao Kaji; Futoshi Ishizaki; Masayoshi Chihaya, all of Kanagawa, Japan

[73] Assignee: Ikeda Bussan Co., Ltd., Ayase, Japan

[21] Appl. No.: 765,209

[22] Filed: Sep. 25, 1991

[30] Foreign Application Priority Data

Sep. 28, 1990 [JP] Japan ................................ 2-259511

[51] Int. Cl.⁵ .............................................. B60R 21/22
[52] U.S. Cl. .................................... 280/730; 280/732
[58] Field of Search ................. 280/728, 730, 743, 732

[56] References Cited

U.S. PATENT DOCUMENTS

| | | | |
|---|---|---|---|
| 3,981,518 | 9/1976 | Pulling | 280/730 |
| 4,966,388 | 10/1990 | Warner et al. | 280/730 |
| 5,033,236 | 7/1991 | Szerdahelyi et al. | 280/730 |
| 5,072,966 | 12/1991 | Nishitake et al. | 280/730 |

FOREIGN PATENT DOCUMENTS 61-95657 6/1986 Japan.
1-117957 8/1989 Japan.

*Primary Examiner*—Kenneth R. Rice
*Attorney, Agent, or Firm*—Foley & Lardner

[57] ABSTRACT

An airbag restraint system for protecting a vehicle passenger in the event of a vehicle serious collision from the lateral side direction of the vehicle. The system comprises an airbag which is disposed at each of doors and a center console located at a center portion between right and left seats. An acceleration sensor is disposed at each of lateral sides of the vehicle to detect side directional impact to the vehicle. When the vehicle is crashed at the one lateral side of the vehicle, the airbags at an impacted side and the center airbag are inflated. Similarly, when the vehicle is crashed at the the other lateral side of the vehicle, the impacted side airbags and the center airbag are inflated.

7 Claims, 3 Drawing Sheets

AIRBAG RESTRAINT SYSTEM

BACKGROUND OF THE INVENTION

1. Field of the Invention

The present invention relates to improvements in an airbag restraint system for protecting a vehicle passenger in a vehicle serious collision, and more particularly to an airbag restraint system which is useful during a lateral directional collision, such as when the doors of the vehicle are impacted.

2. Description of the Prior Art

Hitherto, a variety of airbag restraint systems for automotive vehicles have been proposed and put into practical use in order to protect a vehicle passenger in the event of a vehicle serious collision or the like. Such an airbag restraint system includes an airbag installed on an instrument panel or steering wheel through a base plate. The airbag is momentarily inflated by gas fed from a gas generator in the event of the vehicle serious collision or the like. However, such an airbag restraint system is not effectively operated when the vehicle receives the impact from an right and left door sides. In order to overcome the above-mentioned drawback, an airbag restraint system has been proposed which is useful in the event that the collision occurs in the vehicle lateral direction. Such an airbag restraint system is disclosed in Japanese Utility Model Provisional Publication Nos. 1-117957 and 61-95657. In such an airbag restraint system, an airbag is received in the armrest installed an each of the right and left doors. The other airbag restraint system has an airbag which is received in the console box disposed beside a driver's seat and which is inflated rearward for passengers seating which are seated on a rear seat.

However, such a conventional airbag restraint system cannot prevent the vehicle passengers in the passenger compartment from impacting into each other.

SUMMARY OF THE INVENTION

It is an object of the present invention to provide an improved airbag restraint system which prevents vehicle passengers who are seated side by side from impacting with each other in the event of a side direction vehicle crash.

Another object of the present invention is to provide an improved airbag restraint system in which an airbag at an impacted side and a center airbag are operated in the event of the vehicle serious collision at a side surface of the vehicle body. The airbag restraint system lowers a rising of compartment air pressure and lowers an exchanging cost of the airbag restraint system.

An airbag restraint system according to the present invention is applied to a vehicle which has first and second seats arranged side by side in the lateral direction of the vehicle. The airbag restraint system comprises a first airbag which is disposed at a first portion outside of the first seat relative to a vertical plane including a longitudinal axis of the vehicle. A second airbag is disposed at a second portion outside of the second seat relative to the vertical plane. A center airbag is disposed between the first and second seats.

With this arrangement, the passengers in the vehicle are protected from injury in the event that the vehicle experiences a crash from the side. Thus, the center airbag securely prevents the right side and left side passengers from impacting with each other.

BRIEF DESCRIPTION OF THE DRAWINGS

In the drawings, like reference numerals designate like elements and parts throughout the figures, in which.

DETAILED DESCRIPTION OF THE INVENTION

Figure 1:
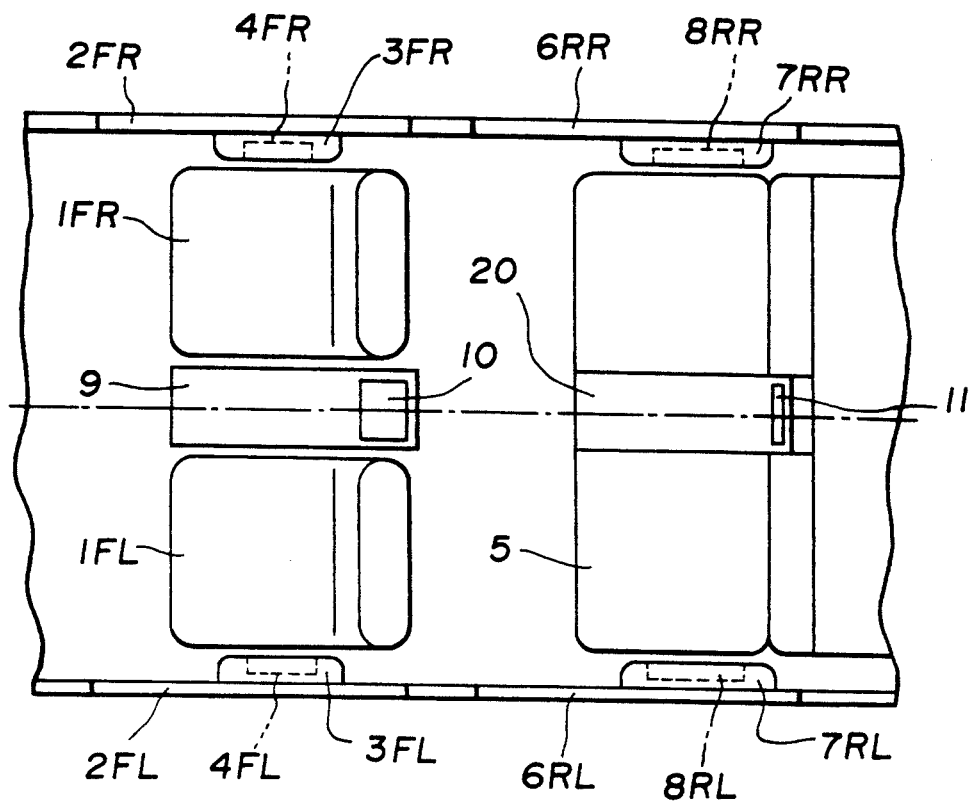
FIG. 1 is a top view of a vehicle compartment in which an airbag restraint system according to the present invention is installed.

Referring now to FIGS. 1 to 5, there is shown an embodiment of an airbag restraint system in accordance with the present invention. The airbag restraint system of this embodiment is for an automotive vehicle and comprises a first (front right) side airbag 4FR and a second (front left) side airbag 4FL which are installed in first (front right) and second (front left) armrests 3FR and 3FL of first (front right) and second (front left) doors 2FR and 2FL, respectively. That is, the first and second airbags 4FR and 4FL are disposed opposite to each other relative to a vertical plane X including a longitudinal axis as shown in FIG. 1, and are located outside of front seats 1FR and 1FL which are arranged side by side. A third (rear right) side airbag 8RR and a fourth (rear left) side airbag 8RL are installed in third (rear right) and fourth (rear left) armrests 7RR and 7RL of third (rear right) and fourth (rear left) doors 6RR and 6RL respectively so as to be disposed opposite to each other relative to the vertical plane X and are located outside of a rear right seat 5. A first center airbag 10 is disposed at a back portion of a front center console 9 between the front seats 1FR and 1FL. The second center airbag 11 is disposed at a center portion of the rear seat 5.

Figure 2:
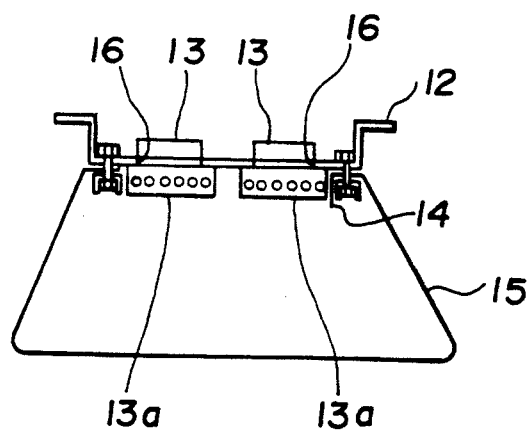
FIG. 2 is a cross-sectional view of an airbag installed at right and left doors.

Each of the first, second, third and fourth side airbags 4FR, 4FL, 8RR and 8RL includes a gas generator 13 fixed to a base plate 12 by bolts and nuts (no numeral), as shown in FIG. 2. Gas generated by the gas generator 13 is fed into an airbag body 15 through a gas inlet 14 connected to the airbag body 15. The airbag body 15 is made of a cloth laminated by a plastic film. The base plate 12 has a pair of through holes 16 at a generally center portion thereof. The gas generator 13 is installed to the base plate 12 upon protruding forwardly through the through hole 16. Thus, a gas outlet portion of the gas generator 13 is inserted into the airbag body 15 through the gas inlet 14.

Figure 3:
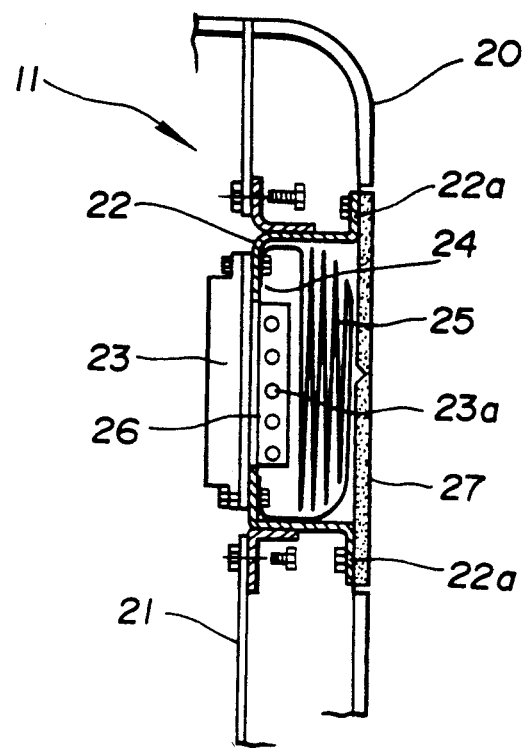
FIG. 3 is a cross-sectional view of a rear center airbag in a folded condition.
Figure 4:
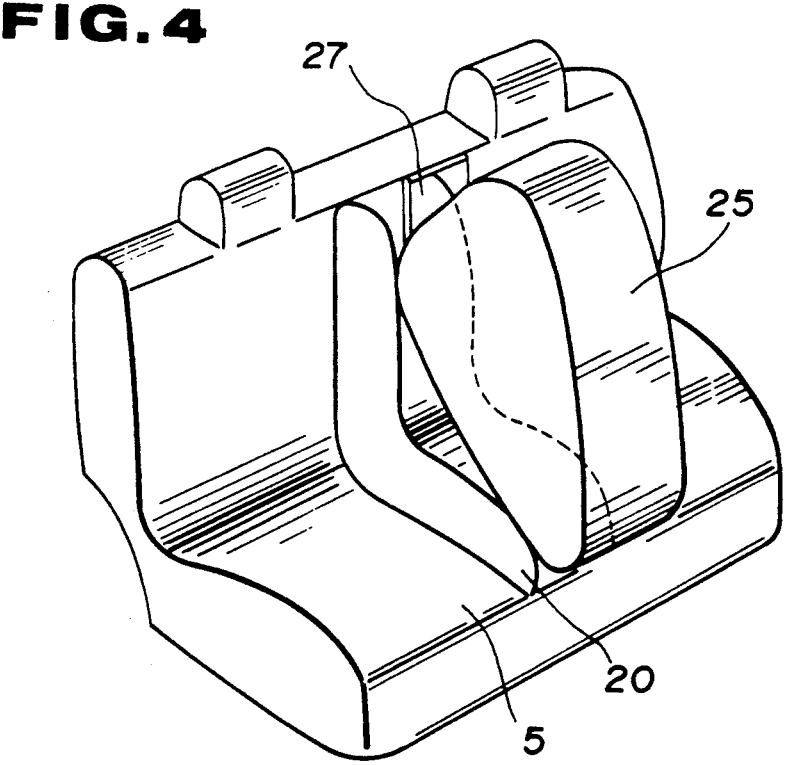
FIG. 4 is a perspective view of a rear center airbag in an inflated condition.

The second center airbag 11 is disposed at an upper portion of a rear center console 20 located at the center portion of the rear seat 5. The second center airbag 11 includes a box-shaped base plate 22 which is secured to a rear seat frame section 21 through bolts and nuts (no numeral). The base plate 22 is provided at its central portion with a pair of through holes 26. A pair of gas generators 23 are fixed to the base plate 22 with bolts and nuts (no numeral) so that the front end portion of the gas generator protrudes forward through the through hole 26. The gas generated by the gas generator 23 is fed into an airbag body 25 of the second center airbag 11 through a gas inlet 24 of the airbag body 25. Thus, the gas outlet 23a of the gas generator 23 is inserted into the airbag body 25 through the gas inlet 24. The base plate 22 is disposed to correspond its upper end with the front end surface of the rear center console 20 which extend vertically. A breakable cover member 27 is connected with the upper end portion 22a of the base plate 22 in order to cover the folded airbag body 25, as shown in FIG. 3. The second center airbag 11 is inflated forward and downward thereof in order to prevent the seating passengers on the rear seat 5 from being violently hitting each other in the event of a vehicle serious collision or the like. The structure of the first center airbag 10 is similar to that of the second center airbag 11, except that the first center airbag 10 is horizontally disposed at the rear portion of the center console 9.

Figure 5:
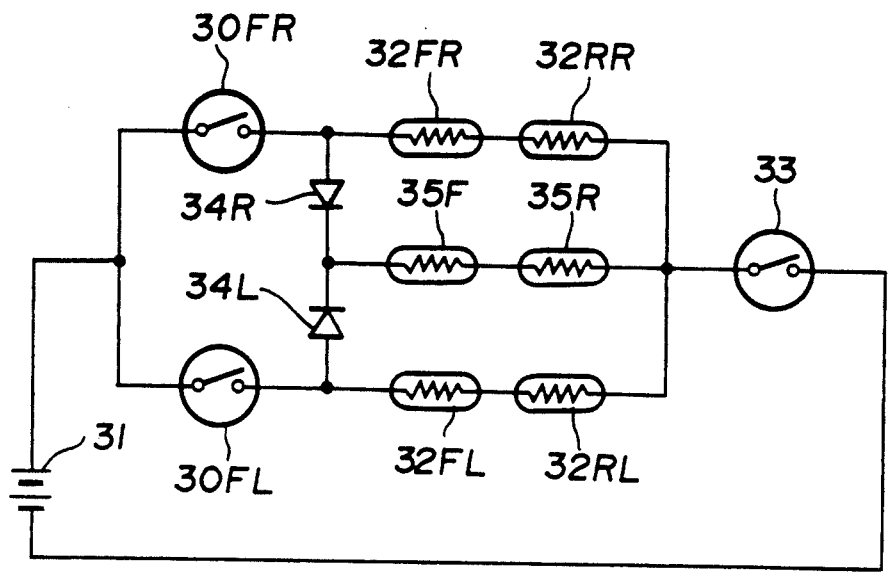
FIG. 5 is an operation control circuit of the airbag restraint system according to the present invention.

First and second acceleration sensors 30FR and 30FL, which detect a vehicle collision at a right side and a left side respectively, are disposed in the first and second side doors 2FR and 2FL, respectively. The acceleration sensors 30FR and 30FL are electrically connected to the gas generators 13 and 23 for the side airbag 4FR, 4FL, 8RR, and 8RL and the center airbags 10 and 11, as shown in FIG. 5. That is to say, the first and second acceleration sensors 30FR and 30FL are connected in parallel to the positive electrode of a battery 31 of the vehicle. When the first acceleration sensors 30FR detects the impact in the event of a vehicle serious collision, a switch included in the first acceleration sensor 30FR is turned on. When the second acceleration sensors 30FL detects the impact in the event of a vehicle serious collision, the switch included in the second acceleration sensor 30FL is turned on. First and third igniters 32FR and 32RR, which act as a starter of the gas generators 13 for inflating the first and third airbags 4FR and 8RR, are serially connected to the acceleration sensor 30FR. Similarly, second and fourth igniters 32FL and 32RL, which act as a starter of the gas generator 13 for inflating the second and fourth airbags 4FL and 8RL, are serially connected to the acceleration sensor 30FL. Fifth and Sixth igniters 35F and 35R, which act as a starter of the gas generator 23 for inflating the center airbags 10 and 11, are serially connected to the acceleration sensor 30FR through a diode 34R, and are serially connected to the acceleration sensor 30FL through a diode 34L. That is, the anode of the diode 34R is connected to the acceleration sensor 30FR, and the cathode of the diode 34R is connected to the igniter 35F. Similarly, the anode of the diode 34L is connected to the acceleration sensor 30FL, and the cathode of the diode 34L is connected to the igniter 35F. A sensor 33, which avoids an erroneous operation of all of the airbags, is serially connected at its one end to each of the third, fourth, and sixth igniters 32RR, 35R, and 32RL. When the third sensor detects a condition that the airbags should not be operated, the sensor 33 turns off a switch included therein. The other end of the sensor 33 connected to the negative electrode of the battery 21.

With this arrangement, the passengers in the vehicle are protected from injury in the event that the vehicle is crashed from its side direction by an object such as a vehicle, even if the vehicle is in a condition such that four passengers ride in the vehicle with one passenger being positioned at each front seat 1FR, 1FL, and at the right side and left side of the rear seat 5. For example, when the vehicle is crashed into at its front left side door 2FL, the acceleration sensor 30FL detects the impact and is turned on. Accordingly, direct current from the battery 31 is supplied to the ignitors 32FL and 32RL and is supplied to the ignitors 35F and 35R through the diode 34L. Upon this operation, the gas generators 13 and 23 become operational so as to momentarily inflate the airbag bodies 15 and 25 into a predetermined shape due to the gas being supplied from the gas generators 13 and 23, in order to protect the passengers from injury. In particular, the center airbags 10 and 11 securely prevent the right side and left side passengers from impacting with each other. Furthermore, in this condition, the airbags 4FR and 8RR at the side opposite to the crashed side are not operated since the second acceleration sensor 30FR is not turned on. This operation suppresses a violent rising of the air pressure in a vehicle compartment and lowers a cost associated with exchanging the airbags.

Figure 6:
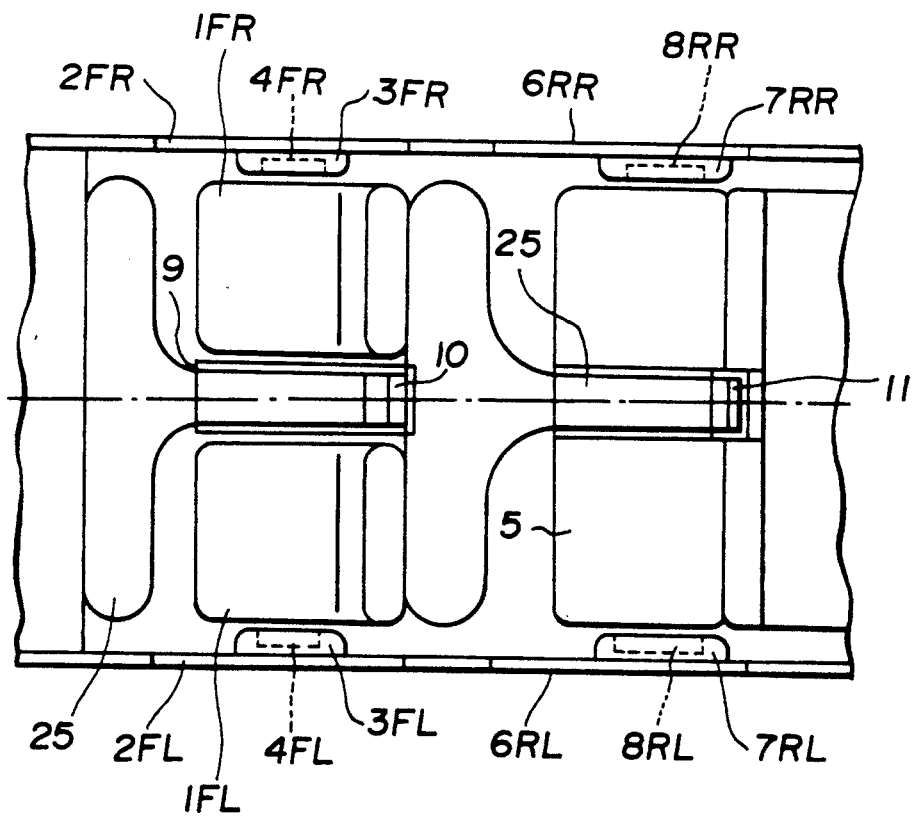
FIG. 6 is a top view of a vehicle compartment in which a second embodiment of the airbag restraint system is applied and is in an inflated condition.

FIG. 6, shows a second embodiment of the airbag restraint system according to the present invention. The airbag restraint system is similar to that of the first embodiment except for center airbag bodies 25. The center airbag body 25 of the second embodiment has a T-shape at an inflated condition, as shown in FIG. 6. The T-shaped center airbag body 25 acts as an airbag for a frontal collision or the like so as to protect the passengers from the impact in the front and aft directions. The airbag restraint system is arranged so that in the event of a vehicle serious collision, the center airbag body 25 is first inflated forward and then inflated in the lateral directions of the vehicle.

While the embodiments of the present invention have been shown and described so that the airbags 4FR, 4FL, 8RR, and 8RL are operated in response to the switching by two acceleration sensors 30FR and 30FL, it will be understood that four acceleration sensors may be applied to the airbags 4FR, 4FL, 8RR, and 8RL, respectively. With this arrangement, each airbag may be respectively operated in response to the four acceleration sensors.

What is claimed is:

1. An airbag restraint system for a vehicle, the vehicle having first and second seats arranged side by side in the lateral direction of the vehicle, said airbag restraint system comprising:
   a first airbag disposed at a first portion outside of the first seat relative to a vertical plane including a longitudinal axis of the vehicle;
   a second airbag disposed at a second portion outside of the second seat relative to the vertical plane; and
   a center airbag disposed between the first and second seats, said center airbag including an airbag body which forms a shock absorbing space between the first and second seats when the airbag body is inflated.

2. An airbag restraint system as claimed in claim 1, further comprising:
   a first sensor installed at the first portion which detects an impact applied to the first portion, said first sensor outputting a signal representative of the impact applied to the first portion;
   a second sensor installed at the second portion which detects an impact applied to the second portion, said second sensor outputting a signal representative of the impact applied to the second portion; and selectively operating means for operating said first and center airbags in response to the signal from said first sensor and for operating said second and center airbags in response to the signal from the second sensor.

3. An airbag restraint system as claimed in claim 1, wherein each of said first, second and center airbags is secured to a vehicle body of the vehicle through a base plate, and said airbags are connected with a gas generator secured to the base plate so as to be supplied with gas from the gas generator.

4. An airbag restraint system as claimed in claim 1, wherein said first and second airbags are installed in first and second armrests, respectively, said first armrest being attached to a first door disposed proximate the first portion, and said second armrest being disposed proximate to the second portion.

5. An airbag restraint system for a vehicle, the vehicle having first and second seats arranged side by side in the lateral direction of the vehicle, said airbag restraint system comprising:

a first airbag disposed at a first portion outside of the first seat relative to a vertical plane including a longitudinal axis of the vehicle;

a second airbag disposed at a second portion outside of the second seat relative to the vertical plane;

a center airbag disposed between the first and second seats;

a first sensor installed at the first portion which detects impact applied to the first portion, said first sensor turning on a first switch included in the first sensor; and a second sensor installed at the second portion which detects impact applied to the second portion, said second sensor turning on a second switch included in the second sensor;

a first ignitor for operating said first airbag, the first ignitor being electrically connected to said first switch;

a second ignitor for operating said second airbag, the second ignitor being electrically connected to the second switch;

a third ignitor for operating said center airbag, the third ignitor being electrically connected to said first switch through a first diode so that an anode of the first diode is electrically connected to the first switch and a cathode of the first diode is electrically connected to said center airbag, and being electrically connected to the second switch through a second diode so that an anode of the second diode is connected to the second switch and a cathode of the second diode is connected to said third ignitor;

a third sensor electrically connected to said first, second and third ignitors, said third sensor turning off a third switch included therein when the third sensor detects a condition that said first, second, and center airbags should not be operated; and a battery having a positive electrode and a negative electrode, said battery being connected at the positive electrode to the first and second switches, and being connected at the negative electrode to the third switch.

6. An airbag restraint system for a vehicle, the vehicle having first and second seats arranged side by side in the lateral direction of the vehicle, said airbag restraint system comprising:

a first airbag disposed at a first portion outside of the first seat relative to a vertical plane including a longitudinal axis of the vehicle;

a second airbag disposed at a second portion outside of the second seat relative to the vertical plane; and a center airbag disposed between the first and second seats, said center airbag including an airbag body which, at times when the vehicle is in a collision, inflates to form a shock absorbing space between the first and second seats such that at times when passengers are seated in said first and second seats, the passengers are prevented from impacting with each other.

7. An airbag restraint system for a vehicle, the vehicle having first and second seats arranged side by side in the lateral direction of the vehicle, said airbag restraint system comprising:

a first airbag disposed at a first portion outside of the first seat relative to a vertical plane including a longitudinal axis of the vehicle;

a second airbag disposed at a second portion outside of the second seat relative to the vertical plane; and a center airbag disposed between the first and second seats, said center airbag including an airbag body which forms a T-shape in an inflated condition to form a shock absorbing space between the first and second seats, and in front of the first and second seats.

* * * * *